Patented Sept. 28, 1948

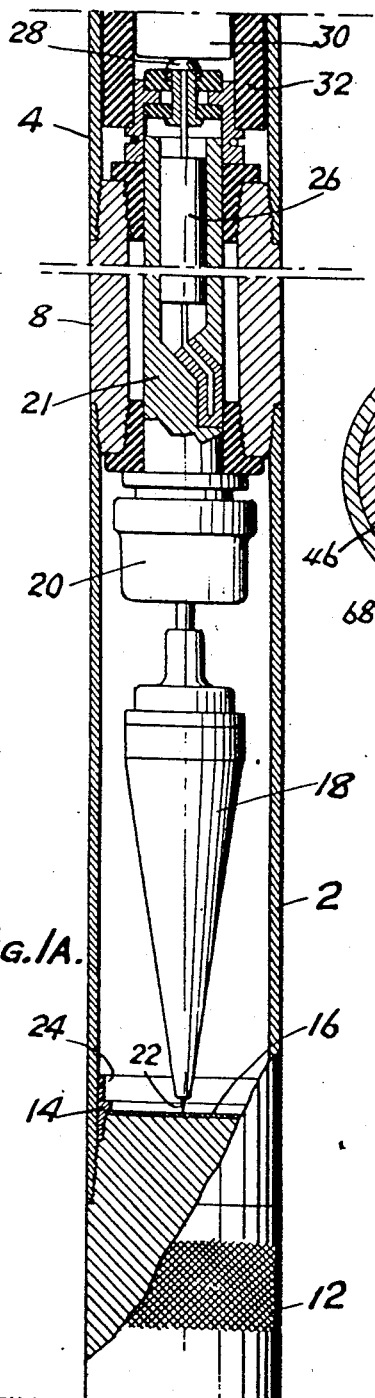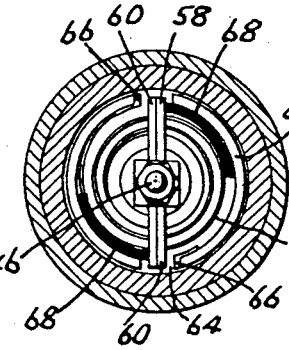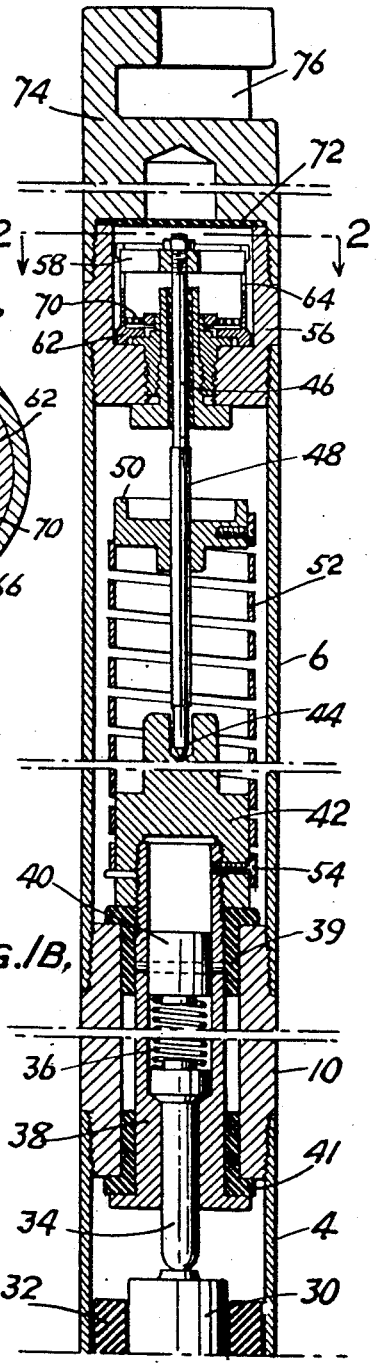

2,450,060

UNITED STATES PATENT OFFICE 2,450,060

WELL SURVEYING INSTRUMENT

Roland Ring, Houston, Tex., assignor to Sperry-Sun Well Surveying Company, Philadelphia, Pa., a corporation of Delaware Application November 20, 1945, Serial No. 629,729

10 Claims. (Cl. 33—205.5)

This invention relates to a well surveying instrument, and has particular reference to the surveying of bore holes by the so-called go-devil method.

This application is in part a continuation of my abandoned application Serial Number 477,033, filed February 25, 1943.

In the patent to Roland Ring 2,246,319, dated June 17, 1941, and in an abandoned application of said Roland Ring Serial No. 379,835, filed February 20, 1941, there are described an instrument and methods of operating the same, which instrument is characterized by a slow and continuous marking action, specifically electrolytic in character, whereby a record of the position of the instrument within a bore hole is made only when the instrument remains stationary for an extended period of time. For a better understanding of the nature of the present invention, which is not, however, limited for its application to said instrument of the above mentioned patent and application, the operation of said Ring instrument my be described as follows:

If the instrument is run into a bore hole, either within a drill stem or in an open hole by means of a wire line or cable, the movements of the instrument incidental to its descent into the hole cause a pendulum to move about relative to a record member, so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period of upwards of about one minute, with the result that the electrolytic action is concentrated at one point of the record member and an easily distinguishable spot is made thereon. If it is then desired to make one or more additional records at other levels, the instrument is moved to these successive levels and permitted to remain at them for different periods of time, with the result that marks differing in intensity and/or size are produced which, by their nature, can be identified with the particular levels through a knowledge of the relative times during which the instrument was stationary. Following the completion of the record or records, the instrument is then withdrawn continuously from the hole and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with other types of surveying instruments involves their being dropped freely through a drill stem so that they come to rest in a position adjacent the bit. During this location in a position of rest, a record is made under the control of suitable timing means and the instrument is then recovered when the bit is brought to the surface, for example for the purpose of changing the bit or checking its condition.

In the use of said Ring instrument in go-devil fashion, the motion of the instrument through the drill stem prevents the making of any record during its fall, and a record is then made by holding the drill stem stationary for a sufficient period of time while the instrument rests adjacent the bit. If the drill stem was then raised and dismantled by continuous work of the drilling crew, the instrument would be subject to sufficiently continuous agitation, with only quite limited periods of rest, so that no record obliterating markings would be produced on the record member. However, it is not usual for a derrick crew to work continuously in removing a drill stem from deep holes, and generally speaking, even if some mechanical reason for delay does not occur, the workmen, after raising the drill stem part way, will take a short period of rest before proceeding further. If an instrument of the Ring type is in the drill stem during such a period of rest, or any other period of stationary condition of the drill stem, it will be obvious that another record will be made which might be indistinguishable from the desired record unless a substantially different time of rest is involved, and even then in some rare instances, particularly where the hole is substantially straight, the two records may overlap so that the significance of the original one is lost. It is generally not desirable to rotate the drill stem during such a period of interruption of its withdrawal, and consequently, such rotation is not a practical solution to the problem.

The present invention relates to the provision of means for terminating the recording action of a recording instrument of the Ring or other type at a desired time.

The foregoing and other objects of the invention, particularly relating to details, will become apparent from the following description, read in conjunction with the accompanying drawings, in which:

Figures 1A and 1B are respectively longitudinal sectional views through the lower and upper portions of a well surveying instrument; and Figure 2 is a transverse section taken on the plane the trace of which is indicated at 2—2 in Figure 1B.

The instrument illustrated in the drawing is basically of the type disclosed in said Ring application and comprises an inner casing adapted to be located in a fluid-tight protective casing in use. The inner casing comprises tubes 2, 4 and 6, joined by coupling members 8 and 10. Threaded into the bottom of the tube 2 is a plug 12 on which may be secured the record member 16 by means of a threaded ring 14, though the record member may be secured in the plug, for example, by depression within a flanged portion thereof. This record member, as described in detail in said Ring patent and application, preferably comprises a sheet of paper containing a colored material such as a colored metallic ferrocyanide which, upon the passage of an electrical current while it is moist, will be marked with a white spot by reason of the formation of alkali at a cathode provided by a metallic point 22 slidable within a pendulum 18 mounted for universal pivotal movement in a bearing arrangement 20. An insulating ring 24 prevents short circuiting by preventing contact of the pendulum with the metallic wall of the tube 2.

The bearing 20 is mounted at the lower end of a cylindrical pin 21 which extends through an opening in the coupling member 8 and is insulated therefrom as indicated. Within pin 21 there is a resistor 26, the lower lead of which is soldered within an opening in the pin 21 while the upper lead of this resistor is electrically connected to a contact button 28 on which may rest the bottom of the lowermost of a group of batteries 30 arranged in series in flashlight fashion and held within an insulating tube 32.

Contact with the positive pole of the uppermost battery is made by means of metallic pin 34 mounted in a fitting 38 insulated as indicated from the casing of the instrument. A spring 36 urges the pin 34 downwardly, reacting against a member 40 located in the bore of the fitting 38. A nut 42 is threaded on the upper end of the fitting 38 and serves to secure this fitting in place, clamping the insulating bushings. The nut 42 is provided with a socket 44 to receive the pointed lower end of a spindle 46. This spindle is provided with a square portion 48 on which there is engaged a member 50 provided with a square hole having a sliding fit with the square portion of the spindle. The member 50 is secured to the upper end of a thermally responsive element 52 which takes essentially the form of a spiral spring the lower end of which is secured at 54 to the nut 42. This member 52 may be a spiral bimetallic strip having a tendency to wind or unwind upon temperature changes, in the present instance to effect substantial angular rotation of the spindle 46 about its axis. By reason of the interconnection between the spindle and the member 50, rotation is imparted from the member to the spindle while at the same time there is prevented the exertion of any stress upon the spindle due to upward or downward movement of the member which slides freely therealong.

The upper end of the spindle 46 passes through an insulating bushing in the coupling member 56 and carries at its upper end a member 58 provided with laterally extending arms which are faced as indicated at 60 with silver or some other material capable of making good electrical contacts.

Within the coupling 56 there is located a metallic cup-shaped member 62. In the upper ends of the walls of this member there are provided slots indicated at 64 into which the arms of the member 58 extend. As indicated in Figure 2 the counterclockwise edges of the slots 64 are faced as indicated at 66 with silver or other metal capable of good contact. Arcuate insulating elements 68 are secured to the member 62 so that their ends project past the edges of the slots 64 as indicated in Figure 2 in such fashion as to prevent the arms of the member 58 from engaging the clockwise edges of the slots. The member 62 is mounted so as to have substantial friction restraining its movements in either direction. In order to insure good electrical contact between the member 62 and the casing of the instrument there is connected to its inner surface and to a collet carried by a metallic bushing in the coupling member 56 a hair spring 70 which is so light as not to impose any substantial restraint or restoring force on the member 62. This spring constitutes no more than a good electrical connection.

A cap 74 is threaded on the coupling 56 with the interposition of an insulating washer 72 which prevents any metallic connection between the spindle and the casing if the spindle moves upwardly. The cap 74 is provided with a T-socket 76 for interengagement with a supporting pin in the protective casing of the instrument. The arrangement of the instrument is such that with increase of temperature the spindle 46 is rotated counterclockwise.

In the operation of the instrument, after it is assembled, as indicated in the figures, a moistened record disc being located therein, it is placed in its protective casing and dropped in godevil fashion within a drill stem. So long as there is substantially continuous movement of the instrument both prior to and during the descent no record will be made since the recording action is so slow that the pin 22 will not engage any particular point on the record disc 16 for a sufficiently long time to make a visible mark, or at any rate any mark indistinguishable from a desired record. Recording may be prevented even if the instrument is assembled or set aside prior to its being lowered if it is permitted to rest in an inverted position under which conditions the pin 22 will drop into the pendulum and the circuit will be held open since the pendulum will rest against the insulating ring 24.

It is at least substantially universal to find an increase of temperature with depth in a bore hole. While the amount of the increase of temperature with depth varies in various localities, the increase is substantially universally of considerable amount and may, in the case of deep holes, be such that the temperatures encountered are of the order of 200° F. or more. It also appears that where such rise of temperature occurs, there is a uniformity of gradient, so that a higher level in the hole always has a temperature less than a lower level.

As a consequence of this condition, as the instrument is dropped within the hole it will be found that, even if mud circulation is continued during its descent, it will be subjected to continuously increasing temperatures during the descent. When it reaches the position of rest, because of its own specific heat and because of its being surrounded by imperfect conductors, it will not immediately attain the temperature of the adjacent portion of the hole, but rather its temperature will continue to rise slowly for some time. During this rise of temperature the bimetallic spring 52 will effect counterclockwise movement of the arms of the element 58, maintaining in electrical engagement the contacts 60 and 66 and serving to effect rotation of the ring 62 against the friction which opposes its movement. As a result the electrical circuit of the instrument is completed and accordingly recording takes place by electrolytic action as indicated above and in greater detail in said patent and application.

When it is desired to stop the recording and remove the drill stem from the hole it is only necessary to begin such removal whereupon the pendulum 18 will be set into oscillation and again, despite the continued closure of the electrical circuit, no appreciable recording will take place. As the drill stem is raised and sections removed therefrom this agitation continues. It is quite possible that during the initial part of this raising even though the instrument is being brought to higher levels its temperature will still be below the temperature of the surrounding portions of the hole. However, under all ordinary conditions the removal of the drill stem will not be stopped until it is raised through quite a substantial distance. If this is the case and even if the removal of the drill stem is again later interrupted, the instrument will be brought to a level or levels at which its temperature will be greater than that of the surrounding portions of the hole. Under these conditions a reverse movement of the element 58 takes place breaking the contacts between 60 and 66 and so opening the electrical circuit that the recording will be stopped even though the pendulum may occupy a position of rest with respect to the record disc. As the temperature still further drops the element 58 will engage the insulating segments 68 to rotate the ring 62 in a clockwise direction. Under all ordinary conditions, therefore, the instrument reaches the surface without the remaking of the electrical circuit despite one or more interruptions in the continuity of its removal. At the surface the instrument may be opened and the record examined.

The purpose of the provision of the backstop afforded by the insulating segments 68 is to insure certainty of operation irrespective of a lack of knowledge of the temperature to be encountered at the lowest point reached by the instrument. Between the stop segments 68 and the making of contact at 60, 66, the arms of the member 58 may have only a very limited range of movement corresponding, for example, to a temperature range of only a few degrees. This means that a rise of at least such temperature range will effect closure of the contacts, whereas any drop of temperature will effect opening of the contacts irrespective of the actual thermometric temperatures involved. The arrangement also insures that even though the ring 62 may be jarred during the lowering of the instrument, proper electrical contact will be made when the instrument reaches its rest position since, as indicated above, its temperature always lags to some extent the ambient temperature so that after it comes to the position of rest the arm 58 will always move counterclockwise to make contact even if contact did not previously exist. Likewise, during removal, because of the temperature lag, contact will always be broken after a very short interval even though the ring may accidentally have been jarred into contact closing position.

It may be remarked that the current flowing in the instrument disclosed is very small so that the existence of any substantial force between the contacts is immaterial. Due to the double arm arrangement of the element 58, contacts are normally made at both ends thereof so that even if one should happen to become corroded, contact will normally occur at the other, thus insuring an operation of good reliability. By reason of the fact that a free sliding connection is provided between the square portion of the shaft and the element 50 at the upper end of the bimetallic spring 52, elongation or contraction of the spring incidental to temperature changes will not cause any jamming action, the spindle 46 rotating freely.

It will be evident that various other arrangements may be provided to insure the making or breaking of contacts in this type of instrument or any other types of well surveying instruments. Furthermore, a thermometric device of this type may be used to interrupt recording in other fashions, for example, by tripping closed one or more shutters in an optical device or the like. In brief, the invention lends itself to controlling recording in accordance with substantial vertical movements of an instrument.

What I claim and desire to protect by Letters Patent is:

1. A well surveying instrument comprising means for supporting a record member, means for recording position of the instrument on said record member, and temperature responsive means for controlling the recording action, the last mentioned means comprising a rotary spindle, and a thermally responsive element arranged to rotate said spindle upon occurrence of temperature changes and having a spline connection with the spindle for independent axial movement.

2. A well surveying instrument comprising means for supporting a record member, means for recording position of the instrument on said record member, and temperature responsive means for controlling the recording action, the last mentioned means comprising a rotary spindle, contact arms carried by said spindle, a thermally responsive element arranged to rotate said spindle upon occurrence of temperature changes, and an element arranged to be rotated by the spindle, said element providing electrical contact with said arms during rotation in one direction but arranged to be rotated by the spindle in the opposite direction without electrical connection therewith.

3. A well surveying instrument comprising means for supporting a record member, means for recording position of the instrument on said record member, and temperature responsive means for controlling the recording action, the last mentioned means comprising a rotary spindle, contact arms carried by said spindle, a thermally responsive element arranged to rotate said spindle upon occurrence of temperature changes, and an element arranged to be rotated by the spindle, said element providing electrical contact with said arms during rotation in one direction but arranged to be rotated by the spindle in the opposite direction without electrical connection therewith, said rotary element having a flexible current-carrying grounding connection.

4. A well surveying instrument comprising means for supporting a record member, means for recording position of the instrument on said record member, and temperature responsive means for interrupting the recording action.

5. A well surveying instrument comprising means for supporting a record member, means for recording position of the instrument on said record member, and temperature responsive means for controlling the recording action.

6. A well surveying instrument comprising means for supporting a record member, electrically operating means for recording position of the instrument on said record member, and temperature responsive means for controlling the circuit of said electrically operating means.

7. A well surveying instrument comprising means for supporting a record member, electrically operating means for recording position of the instrument on said record member, and temperature responsive means for controlling the circuit of said electrically operating means to interrupt the recording action.

8. A well surveying instrument comprising means for supporting a record member, electrically operating means for recording position of the instrument on said record member, and temperature responsive means for controlling the circuit of said electrically operating means, said temperature responsive means acting during rise of temperature to maintain said circuit closed and upon fall of temperature thereafter to open said circuit.

9. A well surveying instrument comprising means for supporting a record member, means for recording position of the instrument on said record member, and temperature responsive means for interrupting the recording action upon a drop of temperature.

10. A well surveying instrument comprising means for supporting a record member, means for recording position of the instrument on said record member, and temperature responsive means for maintaining the recording action during a rise of temperature and for interrupting the recording action upon a drop of temperature.

ROLAND RING.

REFERENCES CITED

The following references are of record in the file of this patent:

UNITED STATES PATENTS

| Number | Name | Date |
|---|---|---|
| 2,246,319 | Ring | June 17, 1941 |
| 2,301,757 | Smith | Nov. 10, 1942 |
| 2,317,386 | Kothny | Apr. 27, 1943 |
| 2,412,976 | Emerson et al. | Dec. 24, 1946 |